United States Patent [19]

Kurashige

[11] Patent Number: 5,553,219
[45] Date of Patent: Sep. 3, 1996

[54] FONT OUTLINE AND BIT MAP GENERATOR SYNTHESIZING FILLING DATA WITH SELECTED OUTLINE DATA OR DUPLICATE OUTLINE DATA

[75] Inventor: Kosuke Kurashige, Kanagawa, Japan

[73] Assignee: Fuji Xerox Co., Ltd., Tokyo, Japan

[21] Appl. No.: 350,701

[22] Filed: Dec. 7, 1994

Related U.S. Application Data

[63] Continuation of Ser. No. 880,000, May 8, 1992, abandoned.

[30] Foreign Application Priority Data

May 10, 1991 [JP] Japan .................. 3-135700

[51] Int. Cl.$^6$ .................................................. G06T 9/20
[52] U.S. Cl. .................................................. 395/150
[58] Field of Search .................. 395/110, 141, 395/150, 143, 144; 382/22, 258, 266

[56] References Cited

U.S. PATENT DOCUMENTS

| | | | |
|---|---|---|---|
| 4,829,295 | 5/1989 | Hiroyuki | 395/141 X |
| 4,852,020 | 7/1989 | Morita | 395/141 X |
| 4,959,801 | 9/1990 | Apley et al. | 395/150 |
| 4,974,172 | 11/1990 | Nakai | 395/141 X |
| 4,998,211 | 3/1991 | Hamada et al. | 395/141 X |
| 5,068,803 | 11/1991 | Valdes et al. | 395/150 |
| 5,073,960 | 12/1991 | Nakai et al. | 395/141 X |
| 5,099,435 | 3/1992 | Collins et al. | 395/150 |
| 5,113,491 | 5/1992 | Yamazaki | 395/150 X |
| 5,157,766 | 10/1992 | Butler et al. | 395/141 |
| 5,159,668 | 10/1992 | Kaasila | 395/150 X |
| 5,231,697 | 7/1993 | Yamada | 395/142 |
| 5,233,336 | 8/1993 | Byron et al. | 345/25 |
| 5,237,313 | 8/1993 | Paxton et al. | 345/143 |
| 5,255,357 | 10/1993 | Byron et al. | 395/151 |
| 5,257,116 | 10/1993 | Suzuki | 382/22 X |
| 5,289,170 | 2/1994 | Fuji | 345/144 |

(List continued on next page.)

FOREIGN PATENT DOCUMENTS 64-77089   3/1989   Japan .
1-164992   6/1989   Japan .

OTHER PUBLICATIONS

"Procedural Elements For Computer Graphics," David F. Rogers, pp. 78–109 (1985).
"Algorithm for computer control of a digital plotter," J. E. Bresenham, IBM Systems Journal, vol. 4, No. 1, pp. 25–30 (1965).
"The Edge Flag Algorithm—A Fill Method for Raster Scan Dislays," Bryan D. Agkland, IEEE Transactions on Computers, vol. C–30, No. 1, pp. 41–48 (1981).
"Efficient Polygon–Filling Algorithms for Raster Displays," Michael R. Dunlavey, ACM Transactions on Graphics, vol. 2, No. 4, pp. 264–273 (1983).

*Primary Examiner*—Mark K. Zimmerman
*Assistant Examiner*—Anton W. Fetting
*Attorney, Agent, or Firm*—Finnegan, Henderson, Farabow, Garrett & Dunner, L.L.P.

[57] ABSTRACT

A font data generator provides bit map font data free from blurs and thickening in character strokes from data expressing outline segments. The font data generator includes an outline data generating unit for providing pixel data representing the entire outline of a character. A selected outline data generating unit generates, from the pixel data representing the entire outline of a character, pixel data representing only some outline segments. In one embodiment, outline segments are seleced if, when the entire outline is traced counter-clockwise, the segments must be traced in either left or down directions. A filling data generating unit generates, from data expressing the outline segments of a character, pixel data to fill in the area surrounded by the outine segments. A data synthesizing means synthesizes the selected outline pixel data and the filling pixel data to form a character. In another embodiment, instead of generating selected outline data, the generator identifies pixel data that represents more than one outline segment of a character. This pixel data is then synthesized with filling pixel data to form a character.

6 Claims, 12 Drawing Sheets

○ PIXELS FOR SELECTED OUTLINE DATA (44)

▓ PIXELS FOR FILLING DATA (43)

U.S. PATENT DOCUMENTS

| | | | |
|---|---|---|---|
| 5,293,586 | 3/1994 | Yamazaki et al. | 395/150 X |
| 5,295,240 | 3/1994 | Kajimoto | 345/144 X |
| 5,301,264 | 4/1994 | Hori et al. | 382/22 X |
| 5,305,433 | 4/1994 | Ohno | 395/150 |
| 5,309,548 | 5/1994 | Ohta et al. | 395/110 X |
| 5,309,549 | 5/1994 | Iwamoto et al. | 395/141 X |
| 5,313,573 | 5/1994 | Takahama | 395/150 |
| 5,353,395 | 10/1994 | Tokumasu et al. | 395/141 |

- ● INTERSECTION WITH HALF SCAN
- ○ COORDINATE OF EDGE PIXEL
- ▨ PIXELS FORMING EDGE DATA

○ PIXELS FOR SELECTED OUTLINE DATA (44)

▨ PIXELS FOR FILLING DATA (43)

▨ PIXELS FOR FILLING DATA (43)

○ PIXELS FOR ENTIRE OUTLINE DATA (41)

○ PIXELS FOR DUPLICATE OUTLINE DATA (45)

▨ PIXELS FOR FILLING DATA (43)

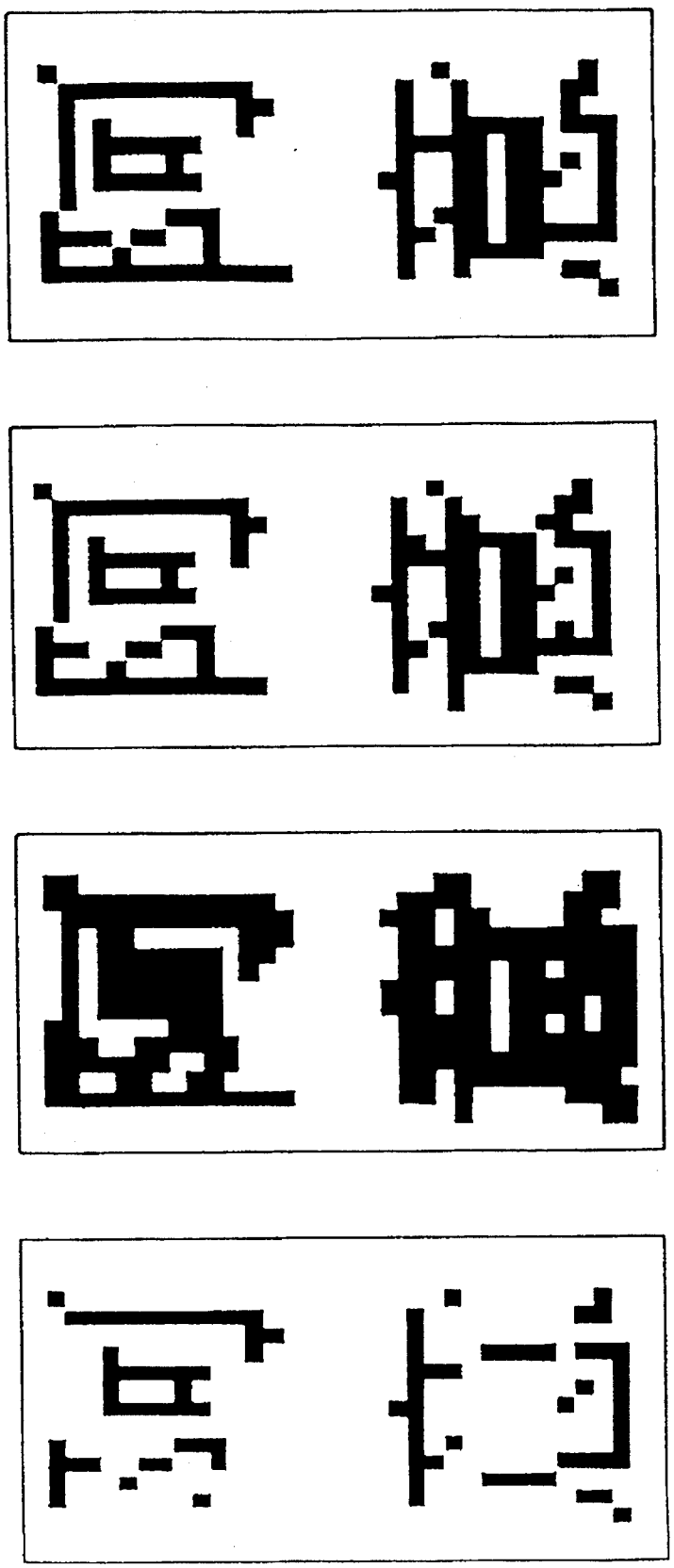

FONT OUTLINE AND BIT MAP GENERATOR SYNTHESIZING FILLING DATA WITH SELECTED OUTLINE DATA OR DUPLICATE OUTLINE DATA

This application is a continuation of application Ser. No. 07/880,000, filed May 8, 1992, now abandoned.

BACKGROUND OF THE INVENTION

1. Field of the Invention

The invention relates to font data generators, and more particularly to a font data generator that generates bit map font data used for displaying, printing or the like from outline font data.

2. Description of the Related Art

State-of-the-art displays and printers must be able to handle multi-size characters, symbols, graphics, and the like. (The characters, symbols, graphics and the like will hereinafter be referred to collectively as the "characters.") If font data of each size is supplied in bit map form, the amount of such data will become enormous. To avoid this problem, outline font data is employed. The outline font data consists of coordinate data expressing respective points of outline segments. Only a single piece of outline font data is for every typeface. Based on such outline font data, bit map font data of a required size is generated. These font data generating systems have been proposed in Published Unexamined Japanese Patent Application Nos. 164992/1989 and 77089/1989.

The bit map font data is generated by enlarging or reducing an outline indicated by the outline font data to desired sizes, and filling the area inside the outline. In this case, for characters of a small dot size (a pixel size), their thin line portions have widths smaller than a single pixel, and this may cause faded and/or lost character strokes and lines.

To prevent this, (1) pixels for "rimming," i.e., pixel data expressing the entire outline segments are synthesized into the bit map font data generated by filling the area inside the outline, or (2) the outline is modified by hint information so that the width of the outline is not reduced to smaller than a single dot, and the bit map font data is generated from such modified outline data.

However, technique (1) brings about the problem of thickening the font in proportion to the pixel data expressing the outline segments even in characters of a normal size, i.e., a size free from blurs or losses of character strokes.

In technique (2) the processing of modifying the outline information is complicated, thus decreasing the processing speed. In addition, the data size is increased in proportion to the amount of the hint information.

SUMMARY OF THE INVENTION

In view of the above, an object of the present invention is to overcome the above problems accompanying the above described conventional system. More specifically, an object of the present invention is to provide a font data generator capable of generating bit map font data including small dots and featuring satisfactory character quality free from blurs and thickening in character strokes from data expressing outline segments.

The above, and other objects of the present invention are accomplished by the provision of a font data generator comprising a filling data generating means for generating, from data representing outline segments, pixel data for filling an area surrounded by the outline segments, a selected outline data generating means for generating, from the data representing the outline segments, pixel data representing at least one outline portion in at least one direction specified when the outline segments are traced around, and a data synthesizing means for synthesizing the filling pixel data and the pixel data representing the outline portions.

Further, according to the present invention, the object is attained by the provision of a font data generator comprising a filling data generating means for generating, from data representing outline segments, pixel data for filling an area surrounded by the outline segments, a duplicate outline data generating means for generating pixel data representing a plurality of outline segments from the data representing the outline segments and a data synthesizing means for synthesizing the filling pixel data and the pixel data representing the plurality of outline segments.

The filling data generating means calculates pixel data representing the entire outline segments from the data representing an outline segment using, e.g., the Bresenham algorithm. Based on such pixel data, data for filling the area inside the outline segments is generated by, e.g., an edge flag algorithm. The pixel data expressing the entire outline segments will hereinafter be referred to as "entire outline data."

The selected outline data generating means, which is an element of the above first aspect of the invention, generates selected outline data for a selected outline portion whose tracing direction is left or down when the outline is traced, e.g., counterclockwise.

The duplicate outline data generating means, which is an element of the above second aspect of the invention, generates duplicate outline data from the data expressing outline segments.

The data synthesizing means synthesizes the selected outline data or the duplicate outline data with the filling data. Accordingly, the desired bit map font data can be generated.

BRIEF DESCRIPTION OF THE DRAWINGS

In the attached drawings:

FIGS. 15 (A) through (D) are diagrams for a comparison of exemplary bit map font data generated by the first embodiment of the invention and exemplary bit map font data generated by the second embodiment of the invention with exemplary conventional bit map font data.

DESCRIPTION OF THE PREFERRED EMBODIMENTS

Figure 1:
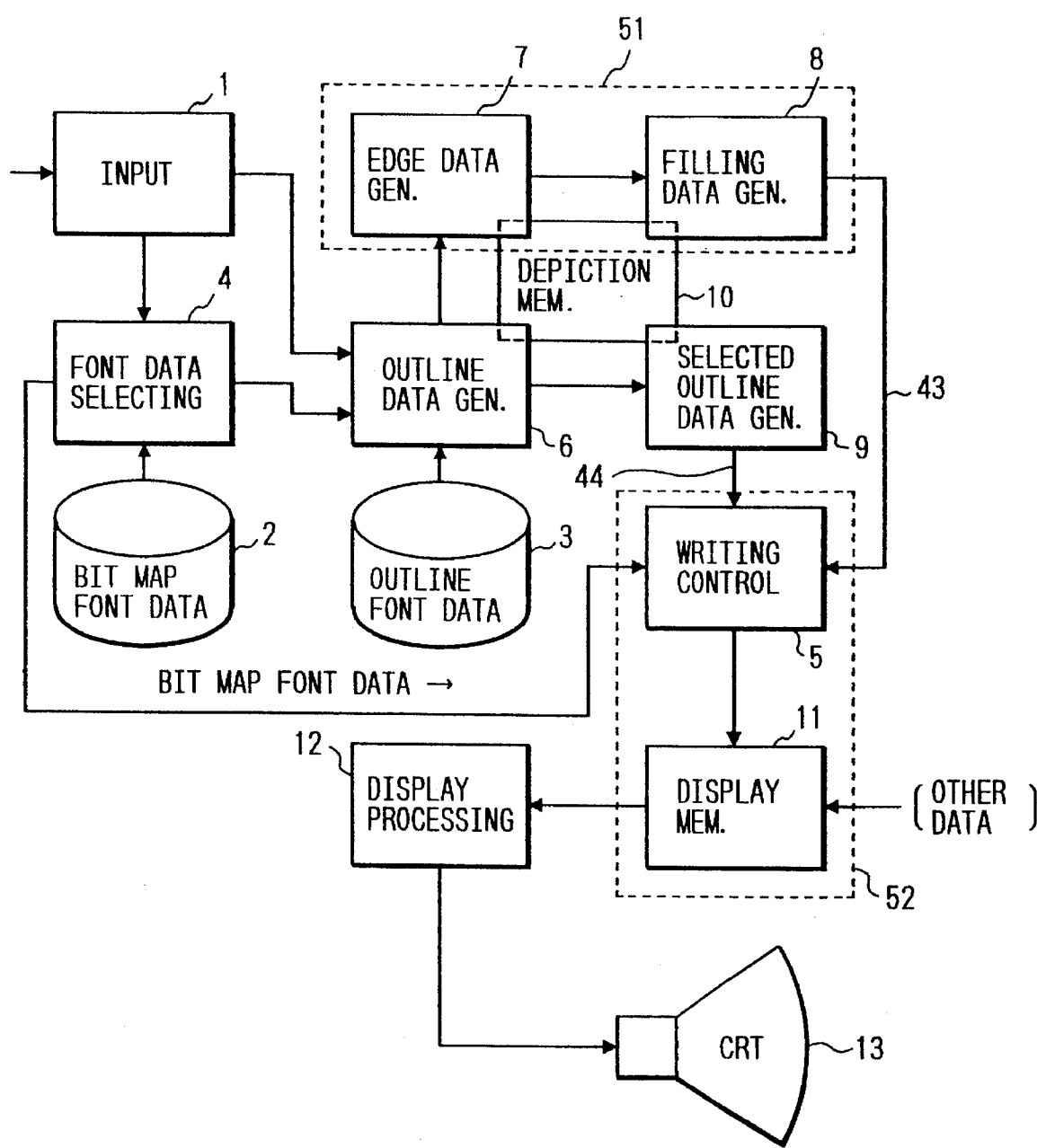
FIG. 1 is a block diagram showing a functional configuration of a first embodiment of the present invention.

The invention will be described in detail with reference to its embodiments shown in the drawings. FIG. 1 shows a functional configuration of the first aspect of the invention. These functions are performed on a workstation or the like. In FIG. 1, reference numeral 1 designates an input section, which receives the information of a character to be displayed from a main control section (not shown) such as a workstation. The information includes a typeface, a character size, and a character code. The information is supplied in the form of a group of character codes that belong to the same typeface and the same size group.

Reference numeral 2 designates a storage medium such as a hard disk or the like, in which bit map font data having a standard dot format, e.g. a format consisting of 24×24 dots is stored. The bit map font data is stored on a file basis, each file dedicated to a single typeface such as Ming-style and gothic. Reference numeral 3 is also a storage medium made up of a hard disk or the like, which stores outline font data. The outline font data is filed for each of the typeface such as Ming-style, gothic and the like.

Reference numeral 4 is a font data selecting section, which searches the bit map font data of a corresponding typeface, size, and character code in accordance with the information supplied from the input section 1, and when the data has been searched, supplies the searched data to a writing control section 5.

Reference numeral 6 designates an entire outline data generating section which generates entire outline data from the outline font data that is the data representing an outline corresponding to the character code when no bit map font data is searched at the font data selecting section 4.

Reference numeral 7 designates an edge data generating section which generates pixel data forming an edge for filling based on the entire outline data 41 generated by the entire outline data generating section 6. The pixel data forming the edge for filling will hereinafter be referred to as the "edge data." Reference numeral 8 designates a filling data generating section which generates filling data based on the edge data. A section having the edge data generating section 7 and the filling data generating section 8 constitutes the filling data generating means of the first aspect of the invention.

Reference numeral 9 designates a selected outline data generating section which generates selected outline data from the entire outline data. In this embodiment, the term "selected outline segment" means an outline portion whose direction is left or down When tracing an outline segment counterclockwise. The pixel data representative of the selected outline segment is the selected outline data. The selected outline data generating section 9 is an embodiment of the selected outline data generating means of the first aspect of the invention. Reference numeral 10 designates a depiction memory, and it is used to generate various data in the entire outline data generating section 6, the edge data generating section 7, the filling data generating section 8, and the selected outline data generating section 9.

The writing control section 5 writes the filling data generated by the filling data generating section 8 and the selected outline data generated by the selected outline data generating section 9 to a display memory 11. Thus, desired bit map font data is generated on the display memory 11. A section 52 having the writing control section 5 and the display memory 11 constitutes the data synthesizing means in the first and second embodiments of the invention.

Reference numeral 12 designates a display processing section which reads bit map font data stored in the display memory 11 and displays the read data on a CRT display 13. Other display data are supplied to the display memory 11 from not shown other blocks.

Figure 2:
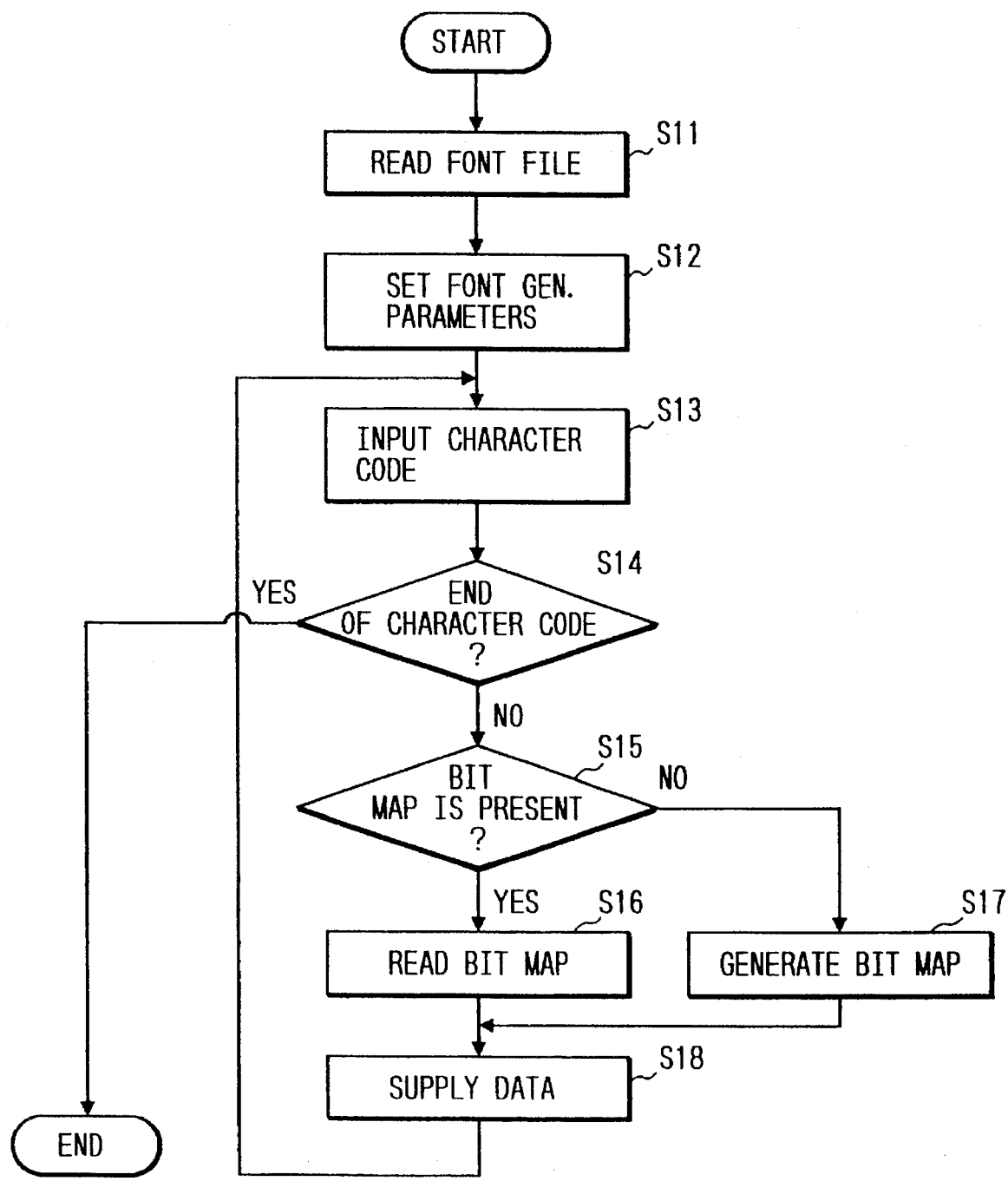
FIG. 2 is a flowchart showing a general processing procedure of the first embodiment of the invention.

FIG. 2 shows a bit map font data supplying procedure that is performed by the above functional configuration. Information about a character to be displayed is received by the input section 1 from the main control section such as a workstation to be supplied to the font data selecting section 4 and the entire outline data generating section 6. Then, the font data selecting section 4 reads bit map font data corresponding to the specified typeface from the storage medium 2. The entire outline data generating section 6 also reads outline font data corresponding to the specified typeface from the storage medium 3 (Step S11). The term "Step" will hereinafter be omitted.

In accordance with the size information supplied from the input section 1, the entire outline data generating section 6 internally sets bit map font data generating parameters (an enlargement/reduction parameter, coordinate converting matrix data, and the like) (S12).

Then, the font data selecting section 4 retrieves a single character code supplied from the input section 1 (S13), and checks whether or not the retrieved character code is the last one (S14). At an initial stage, the answer is "No." Then, the font data selecting section 4 inspects the presence of bit map font data corresponding to that character code (S15).

Since the font data selecting section 4 stores the bit map font data read from the storage medium 2 at this point (as described above), if there is bit map font data corresponding to that character code, then the answer becomes "Yes." In this case, the bit map font data is read (S16).

If the bit map font data is not present, then the bit map font data is generated by the entire outline data generating section 6, the edge data generating section 7, the filling data generating section 8, and the selected outline data generating section 9 (S17). This procedure will be described in detail later.

The writing control section 5 supplies to the display memory 11 either the bit map font data supplied from the font data selecting section 4 or the filling data 43 supplied from the filling data selecting section 8 and the selected outline data 44 supplied from the selected outline data generating section 9 (S18). The display processing section 12 displays the supplied data on the CRT display 13.

Figure 3:
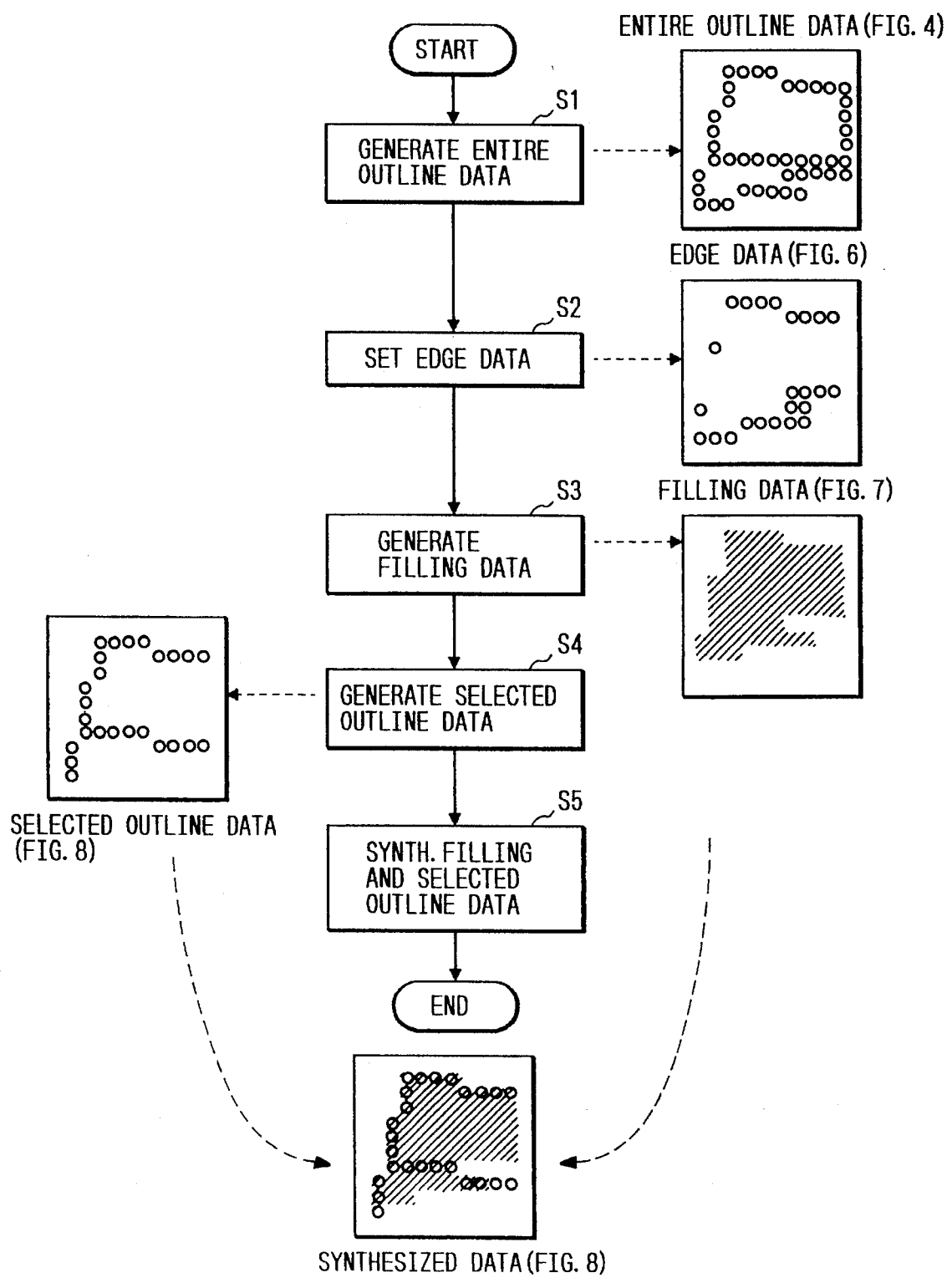
FIG. 3 is a flowchart showing a main portion of the processing procedure of the first embodiment of the invention.

Details of the processing in S17 are shown in FIG. 3. An example of the outline font data is shown in the following Table 1.

TABLE 1

| Point number | x | y |
| --- | --- | --- |
| C1 | 5 | 14 |
| C2 | 3 | 5 |
| C3 | 13 | 7 |
| C4 | 5 | 8 |
| C5 | 13 | 8 |
| C6 | 13 | 13 |
| C7 (C1) | 5 | 14 |

Figure 4:
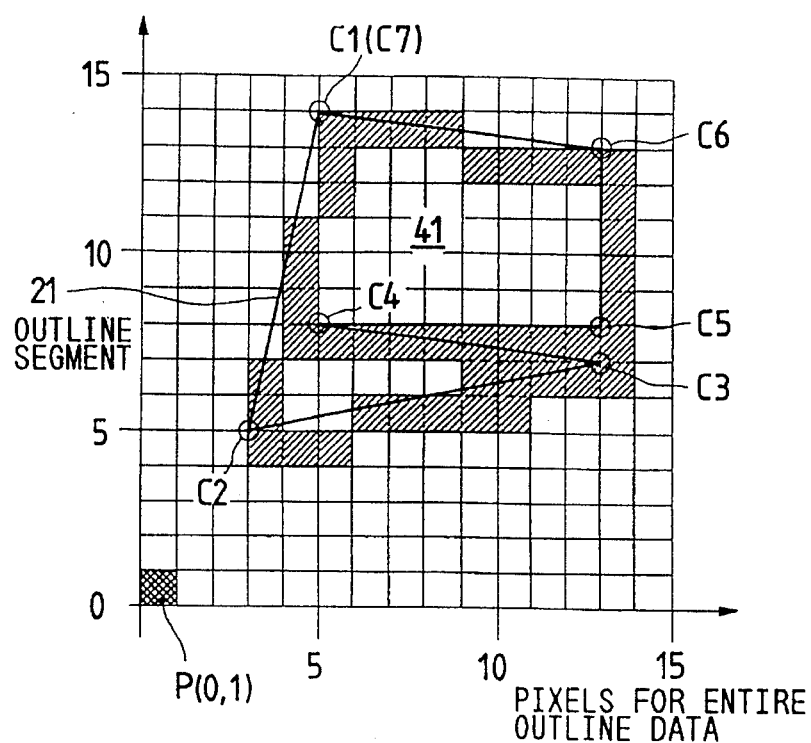
FIG. 4 is a diagram showing exemplary entire outline data.

A real size graphic depicted by this outline font data is shown in FIG. 4. A polygon C1 to C7 expressed by a solid outline 21 is the graphic depicted by this data. The outline 21 is an "ideal" outline. The entire outline data generating section 6 generates entire outline data 41 expressing this graphic (S1). A square depicted by a thin line in FIG. 4, that is, a hatched square indicates a pixel. A group of pixels which is hatched corresponds to the entire outline data 41. The coordinates of each pixel are expressed by the coordinates of an upper left corner (x, y). For example, a pixel P (0, 1) is hatched with crisscrossed lines. Edge data 42 is generated from the entire outline data by the edge data generating section 7 (S2). While the details will be described later, the "Bresenham algorithm" is used in this embodiment as described above. (For this algorithm, see Bresenham, J. E., "Algorithm for Computer Control of a Digital Plotter," IBM System Journal, Vol. 4, pp.25–30, 1965) For the same procedure, a "digital difference analyzer" or the like is also available. (For the digital difference analyzer, see Rogers, David F., "Procedural elements for computer graphics," McGraw-Hill Book Co.)

The filling data generating section 8 generates filling data 43 based on the edge data 42 (S3). While this procedure will be described in detail later, an "Edge Flag Algorithm" is used in this embodiment. (For this algorithm, see Ackland, Bryan, and Weste, Neil, "The Edge Flag Algorithm—A Fill Method for Raster Scan Displays," IEEE Trans. Comput., Vol. C-30, pp.41–48, 1981.) For the same procedure, an "Ordered Edge List," a "Fence Fill Algorithm," or the like are also available. (For the ordered edge list, see, e.g., Rogers, David F., "Procedural elements for computer graphics," McGraw-Hill Book Co. For the fence fill algorithm, see, e.g., Dunlavey, Michael R., "Efficient Polygon-Filling Algorithms for Raster Displays," Trans. on Graphics, Vol. 2, pp.264–273, 1983.)

Selected outline data 44 is generated in S4 by the selected outline data generating section 9. Its details will be described later. The filling data 43 and the selected outline data 44 are written to the display memory 11 by the writing control section 5 in S5. Accordingly, the desired bit map font data can be generated.

A procedure for generating the edge data 42 will be described with reference to FIG. 5. Here, assuming that there is a straight line expressed as x=n+0.5 (n is an integer) which runs in parallel with the Y-axis, such straight line is indicated by a broken line in FIG. 5. This straight line is referred to as the "half scan."

If the coordinates at which the outline 21 intersects the half scan 23 are (n+0.5, y), then a pixel whose coordinates are (n, round (y)) is set as a pixel forming the edge data 42, where "round (y)" is a function for rounding the value y to a closest integer.

Figure 6:
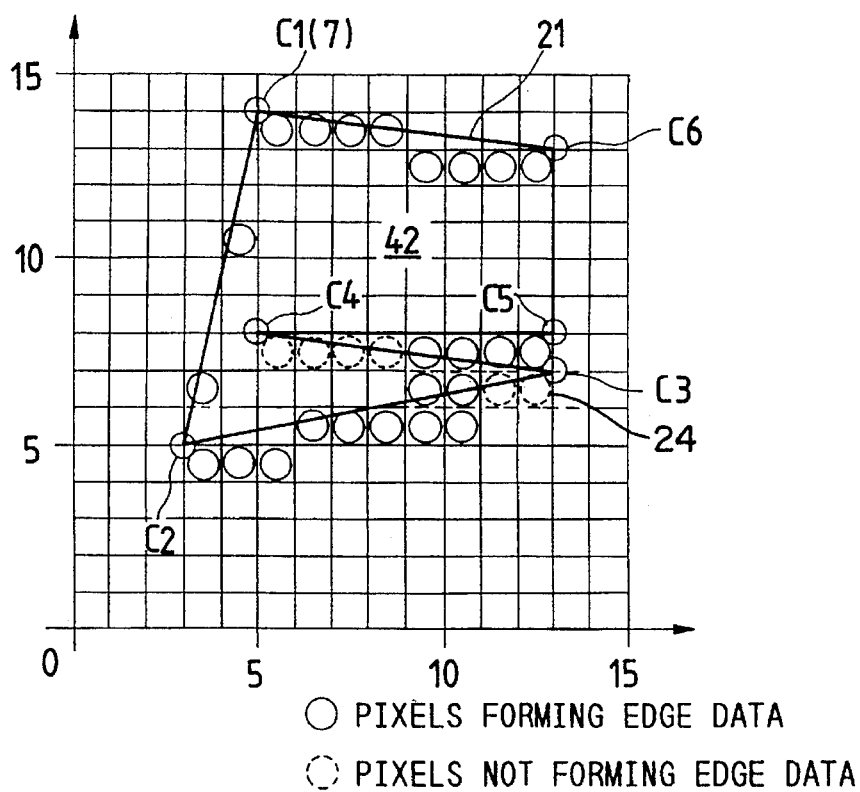
FIG. 6 is an explanatory diagram for the description of the edge data.

The thus generated pixels forming the edge data 42 are shown by circles, each circle being depicted with a solid line, in FIG. 6. A circle 24 depicted with a broken line is not used for the edge because each pixel expresses an even number of outline segments 21. For example, the pixels at y=8 and $5 \leq x \leq 8$ are pixels expressing not only an outline segment C3–C4 but also an outline segment C4–C5.

When a single pixel expresses two or more outline segments 21, the edge flag algorithm takes only the pixel expressing an odd number outline 21 as valid as the edge data 42. When a pixel is actually set as an edge data 42 pixel, whether or not the pixel has been set as a pixel forming the edge data 42 is judged. If already set, the pixel is reset, and if not, the pixel is set.

If the pixel is expressed in a 1-bit logic value (monochromatic), the pixel is set by obtaining the exclusive OR of inputs, i.e., the pixel value and 1 (the true value), and then inverting the obtained result.

Figure 7:
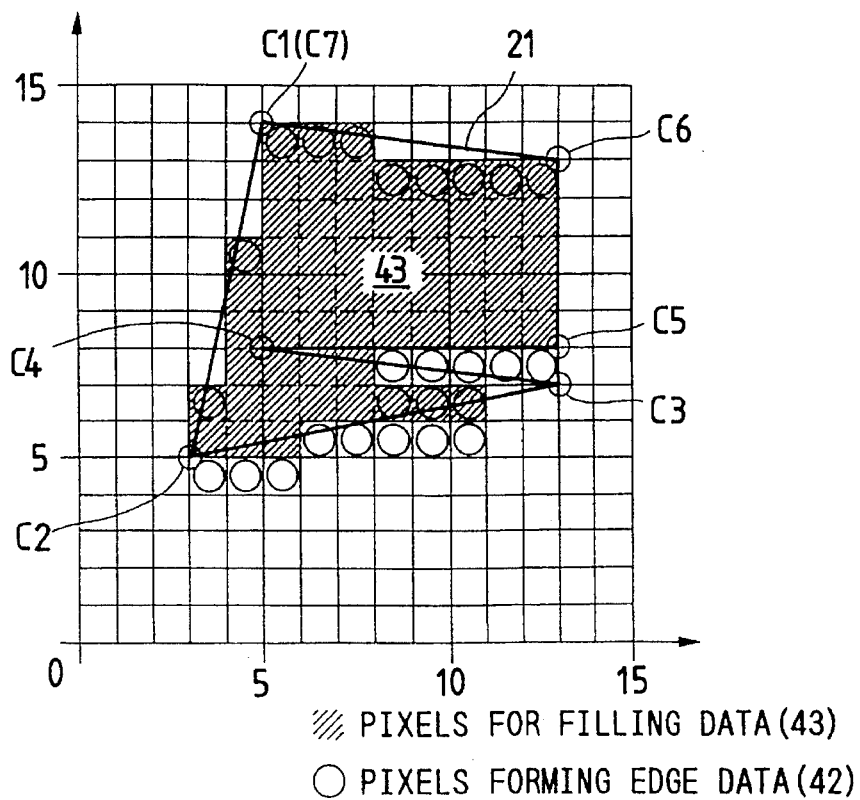
FIG. 7 is an explanatory diagram for the description of the filling data.

The filling data generating section 8 scans each pixel of the edge data 42 vertically from above to generate the filling data 43. The generated filling data 43 is shown by hatching in FIG. 7. The pixels forming the edge data 42 are indicated by circles. Straightforwardly, the filling data 43 is calculated by scanning the pixels from the above downward to find a pixel as the edge data 42 and by inverting the value of such found pixel. Specifically, the exclusive OR of the value of that pixel (y coordinate of the Y-axis) and the value of a pixel (y coordinate of the Y-axis+1), which is the pixel scanned immediately before that pixel, is obtained.

A procedure for generating the selected outline data 44 to be performed in S4 shown in FIG. 3 will be described. The procedure will be outlined first with reference to FIG. 8. In this embodiment, the outline segments 21 whose direction when the outline 21 is traced in the order of C1, C2, C3, and so on is either left or down are termed as the selected outline. Specifically, the outline segments C1–C2, C3–C4, C6–C7 are selected outlines. Selected outline data 44 expressing such outline segments 21 are selected from the entire outline data 41 generated by the entire outline data generating section 6.

Figure 9:
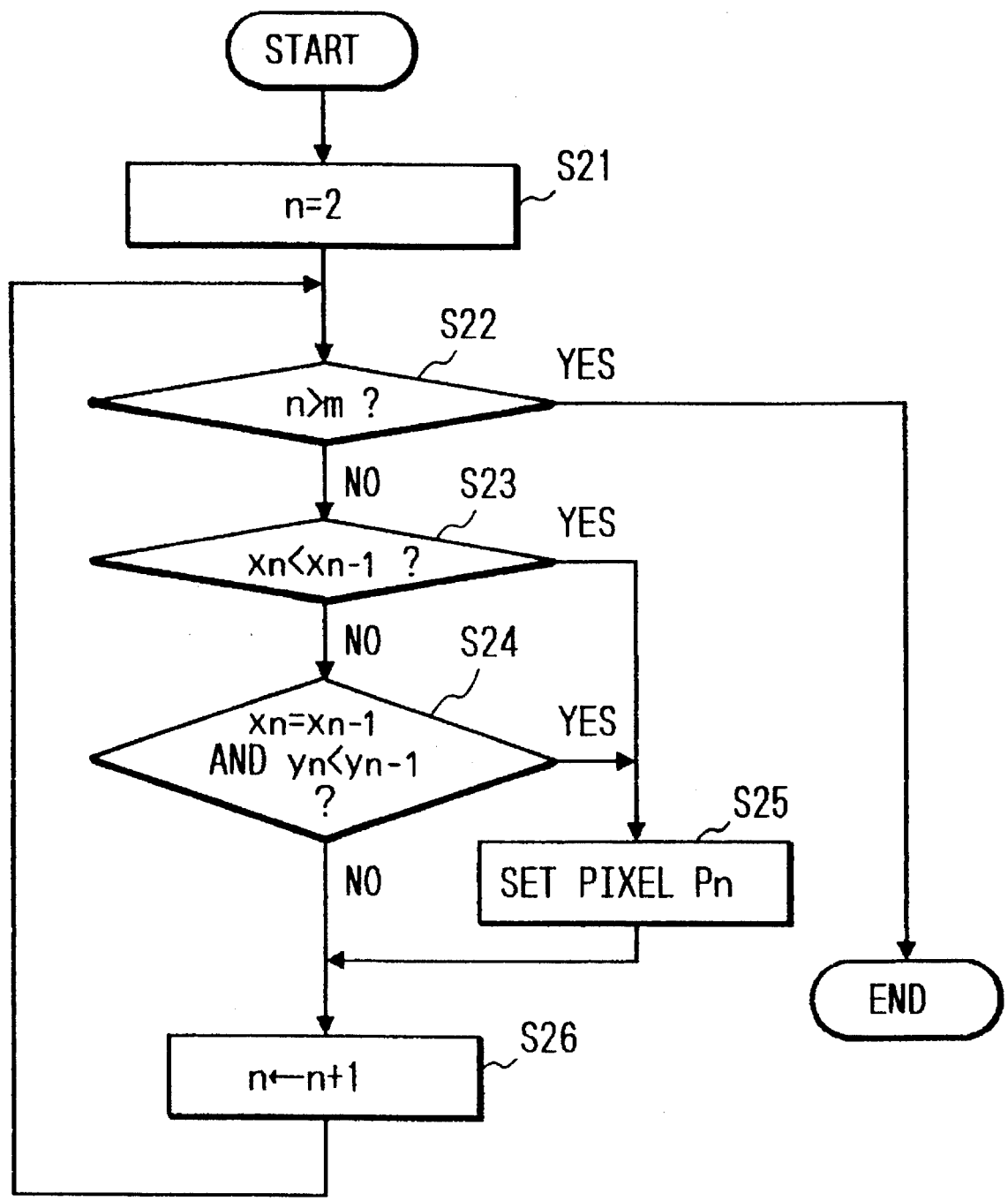
FIG. 9 is a flowchart showing an exemplary procedure for generating selected outline data.

The selected outline data 44 is selected based on the following rules. A flowchart is shown in FIG. 9.

(1) The number of pixels forming the entire outline data 41 is m. Each pixel forming the entire outline data 41 is denoted as Pn. The values m and n are set so that $1 \leq n \leq m$. Any such pixel can be designated as $P_1$. The first pixel is the same as the last pixel, i.e., $P_1 = P_m$. The value m is set to 44 in this embodiment (see FIG. 4).

(2) The processing ends when n becomes larger than m (S22).

(3) A pixel immediately before (the last pixel) is expressed as $P_{n-1} = (x_{n-1}, y_{n-1})$, and a current candidate pixel is expressed as $P_n = (x_n, Y_n)$.

(4) When $x_n < x_{n-1}$, $P_n$ is regarded as the selected outline data 44 (S23, S25).

(5) When ($x_n = x_{n-1}, y_n < y_{n-1}$), $P_n$ is regarded as the selected outline data 44 (S24, S25).

(6) In a case other than the above cases (4) and (5), $P_n$ is not regarded as the selected outline data 44 (S24, when the answer is "No")

(7) The value n is incremented by 1, and the procedure is returned to (2) (S26).

Rule (4) means that the current candidate pixel is located at the left of the last candidate pixel. Rule (5) means that the current candidate pixel is located below the last candidate pixel. The pixel satisfying either one of the above rules is selected as a pixel of the selected outline data 44.

The x coordinate of the current candidate pixel $P_n$ is compared with that of the last candidate pixel $P_{n-1}$ in S23.

Thus, the processing starts with the condition n=2 (a candidate pixel $P_2$) (S21).

Figure 8:
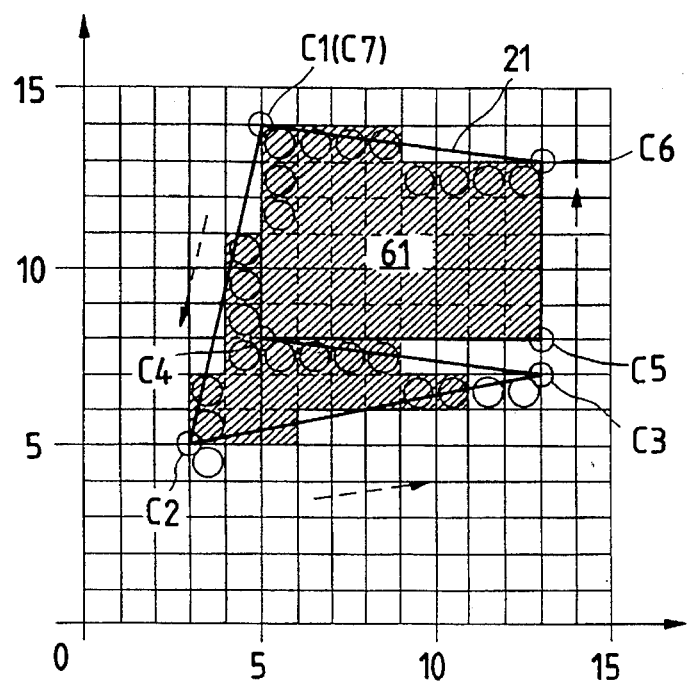
FIG. 8 is an explanatory diagram for the description of bit map font data generated by the first embodiment of the invention.

The thus generated selected outline data 44 and the filling data 43 are synthesized together. A portion 61 obtained by synthesizing the selected outline data 44 indicated by circles and the filling data 43 indicated by hatching in FIG. 8 is the bit map font data. It is only three pixels that are out of the filling data 43. These pixels supplement portions lost, i.e., portions around C2, C3, due to the original outline being too thin in the filling data 43.

Figure 10:
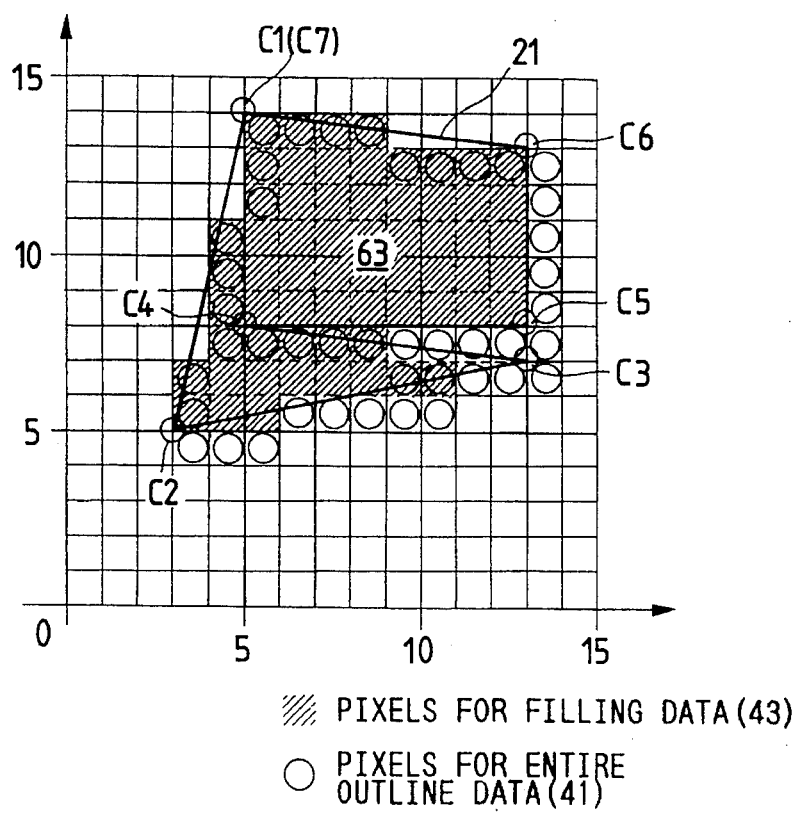
FIG. 10 is an explanatory diagram for the description of data obtained by synthesizing the filling data and the entire outline data.

Synthesized data 63 obtained by synthesizing the entire outline data 41 and the filling data 43 is shown in FIG. 10 for purposes of comparison. There are a number of pixels that are outside the filling data 43 at outline segments C2–C3, C5–C6, and the like. The sharp edge formed by the outline segments C3–C4–C5 is also deformed. The figure depicted by this embodiment exhibits no such thickening nor deformation. The reproducibility of the outline segments 21 is also satisfactory.

Further, bit map font data generated by the conventional technique and bit map font data generated by this embodiment using the same outline font data are shown in FIGS. 15 (A) through (D).

Figure 5:
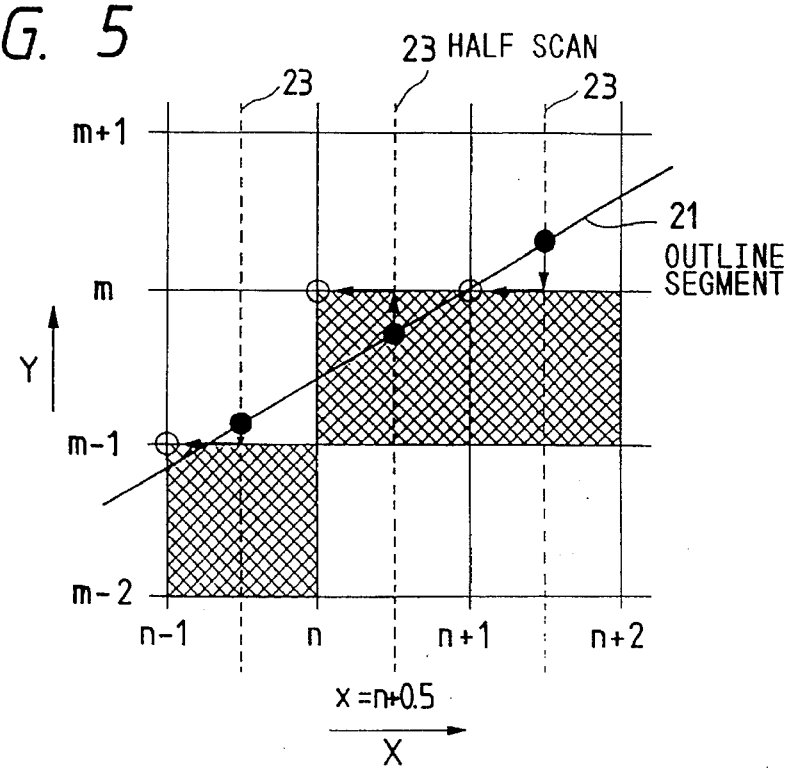
FIG. 5 is a diagram showing an exemplary relationship between pixels forming an outline segment and edge data.

The two Japanese characters depicted in FIG. 5 are illustrated in gothic. FIG. 15 (A) indicates only the conventional font data produced by using only the filling data, in which their vertical and horizontal strokes are lost. FIG. 15 (B) indicates the conventional font data produced by synthesizing the filling data and the entire outline data; there are no lost portions but their strokes are noticeably deformed. The produced font data are conspicuously denser than what they should be. FIG. 15 (C) indicates the font data produced by this embodiment, in which no deformation and increase in density are observed. The problem of lost strokes is also prevented, thus allowing the character strokes to be identified easily, even though the font data are of small dot size.

Some other modes of embodiment will be described.

While the outline segments 21 are traced counterclockwise (so that the inside of the outline is always located at the left) in this embodiment, the tracing sequence may be opposite. The direction of scanning when the area is filled may also be opposite.

While the outline segments 21 are traced counterclockwise and any outline segment whose tracing direction is left and down is referred to as the selected outline in this embodiment, the tracing direction for selecting a selected outline segment may be either left or right, or either up or down. For example, a combination of directions right and down, or a combination of directions left and up may be acceptable.

In this embodiment the generation of the entire outline 41, the generation of the edge data 42, the generating of the selected outline data 44, and the synthesis of these data are performed separately. However, with respect to these operations, a known technique for judging that a pixel extracted on the basis of, e.g., the outline segment 21, is equivalent to a pixel of the edge data 42 or to a pixel of the selected outline data 44 may be employed for every pixel.

While a depiction memory is used to generate the selected outline data 44 in this embodiment, the selected outline data 44 may be stored in the form of coordinate values and written over the filling data 43 after the filling data has been generated. This can dispense with reserving an area for generating the selected outline data 44. The processing time is also curtailed, depending on the shape of a font. The entire outline data 41 may also be processed either in the form of bit map data or coordinate data.

The bit map font data 61 once generated may be stored in a memory section (not shown) and reused when the workstation or the like is in operation.

Figure 11:
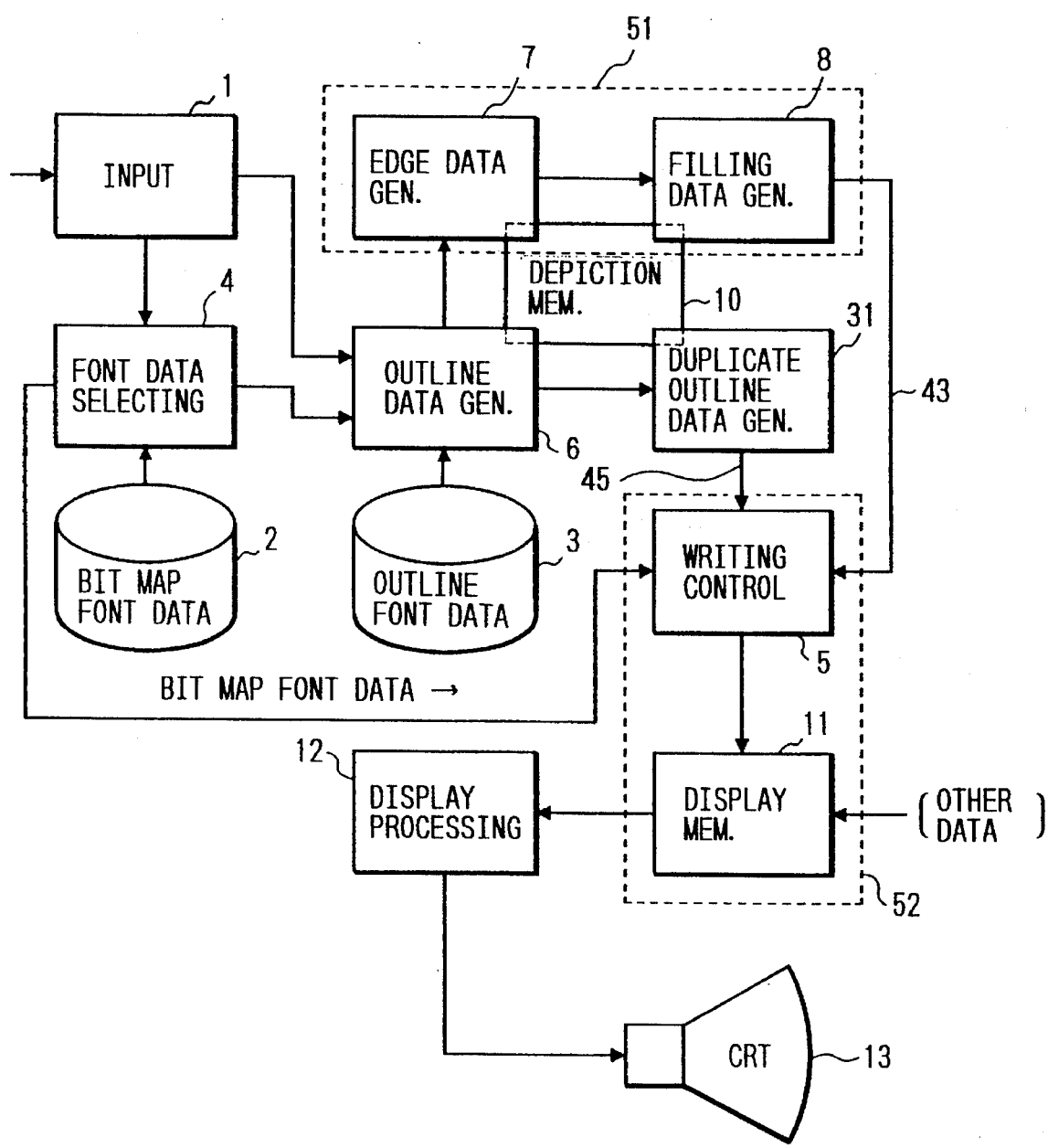
FIG. 11 is a block diagram showing a functional configuration of a second embodiment of the invention.
Figure 12:
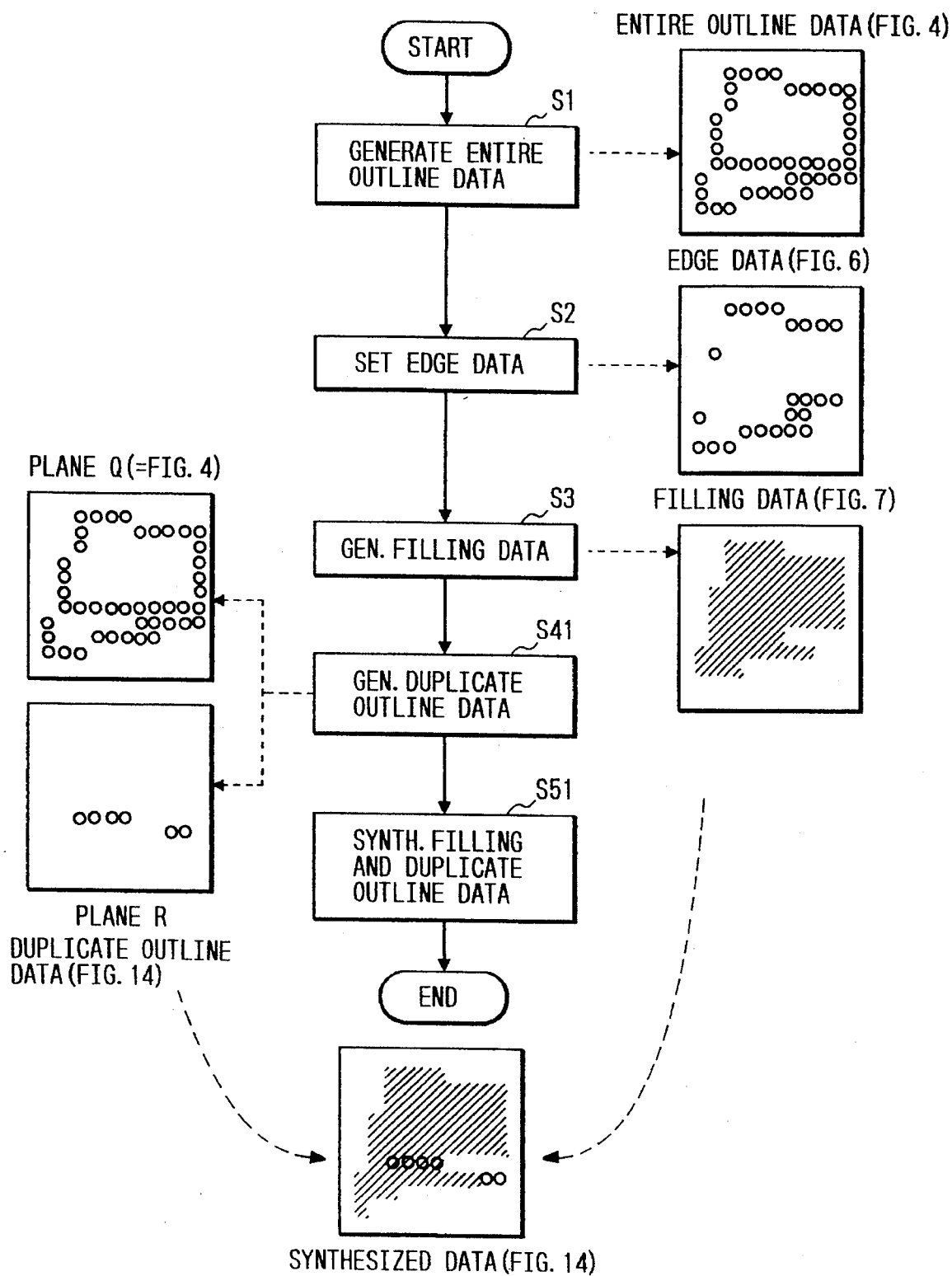
FIG. 12 is a diagram showing a main portion of a processing procedure of the second embodiment of the invention.

Another embodiment of the invention is shown in FIG. 11 through FIG. 15. FIG. 11 shows a functional configuration. Only a duplicate outline data generating section 31 differs from the first embodiment of the invention. FIG. 12 shows its processing procedure. Procedural steps in which duplicate outline data is generated (S41) and filling data 43 is synthesized with the duplicate outline data (S51) are different from the procedure for the first embodiment of the invention. The duplicate outline data is identical with the pixels indicated by dotted circles in FIG. 6.

Figure 13:
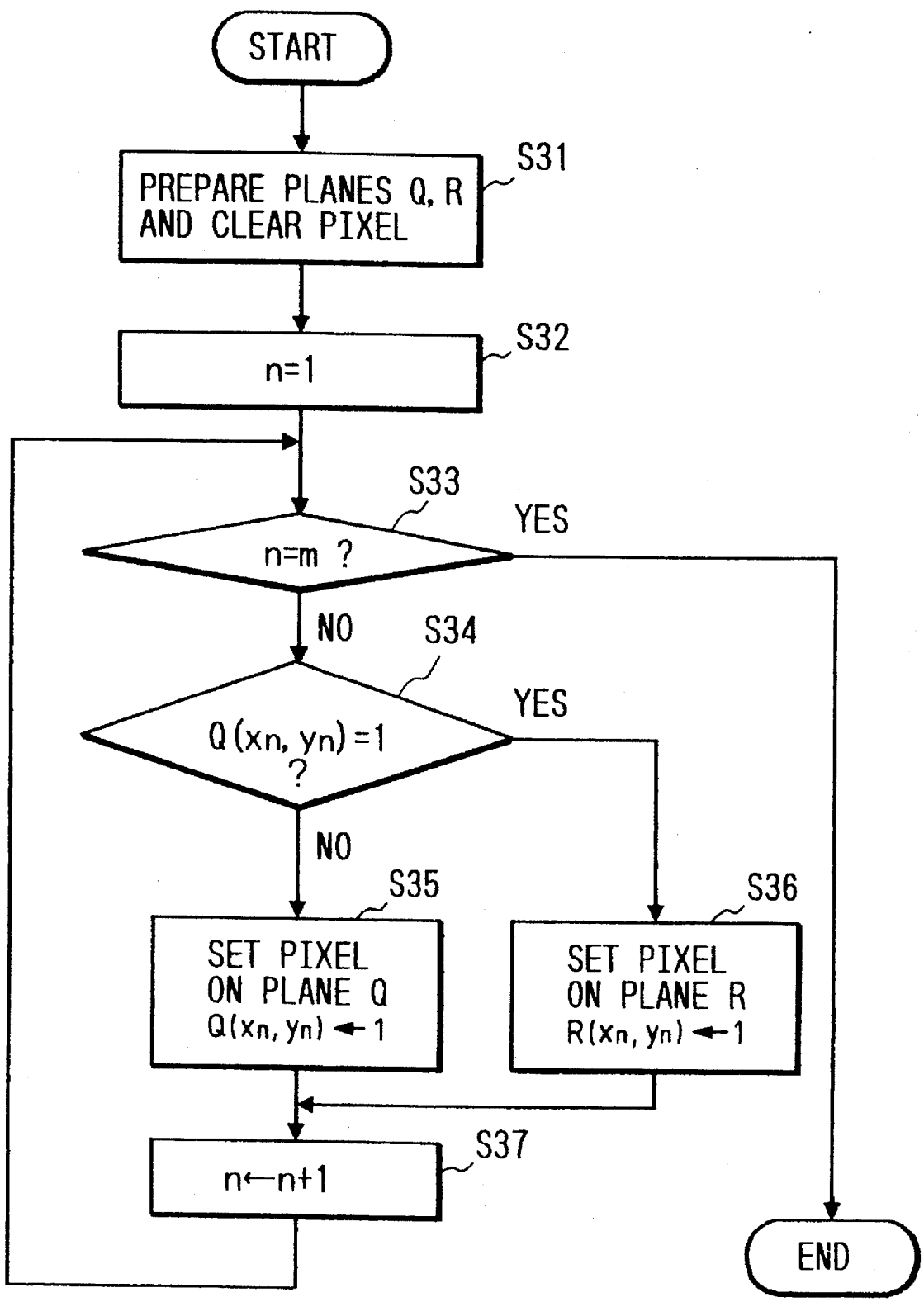
FIG. 13 is a flowchart showing a procedure for generating duplicate outline data.

Details of S41 are shown in FIG. 13. The sequence of tracing the outline segments 21 may either be counterclockwise or clockwise. The same effect may be obtained by reversing the tracing sequence.

The duplicate outline data 45 is generated by the following rules.

(1) Two bit planes (a depicting area), each of which is large enough to include a polygon herein treated, are prepared in a depiction memory 10.

Each pixel is cleared (S31). A pixel (1 or 0) in each of the two bit planes, a plane Q and a plane R, is expressed as Q (x, y) and R (x, y).

(2) There are m pixels in the entire outline data 41 and these pixels are expressed as $P_n$ ($1 \leq n \leq m$). The first point is the same as the last point; i.e., $P_1 = P_m$. Any pixel may be designated as $P_1$. The value "n" is initially set to 1 (S32).

(3) The processing ends when n=m. (S33).

(4) If a pixel Q ($x_n$, $y_n$) on the plane Q corresponding to $P_n$ has already been set, a pixel R ($x_n$, $y_n$) of the plane R is set to 1 (S36); otherwise, a pixel Q ($x_n$, $y_n$) on the plane Q is set to 1 (S35).

(5) The value "n" is incremented by 1, and the processing is returned to rule (3) (S37).

It is the pixel set on the plane R that is the pixel of the duplicate outline data 45 to be obtained, i.e., the pixel expressing a plurality of outline segments 21. The plane Q is used to check that the pixel is specified for a plurality of times as a pixel expressing the outline segments 21. The pixel data remaining on the plane Q are merely copies of the entire outline data 41.

Figure 14:
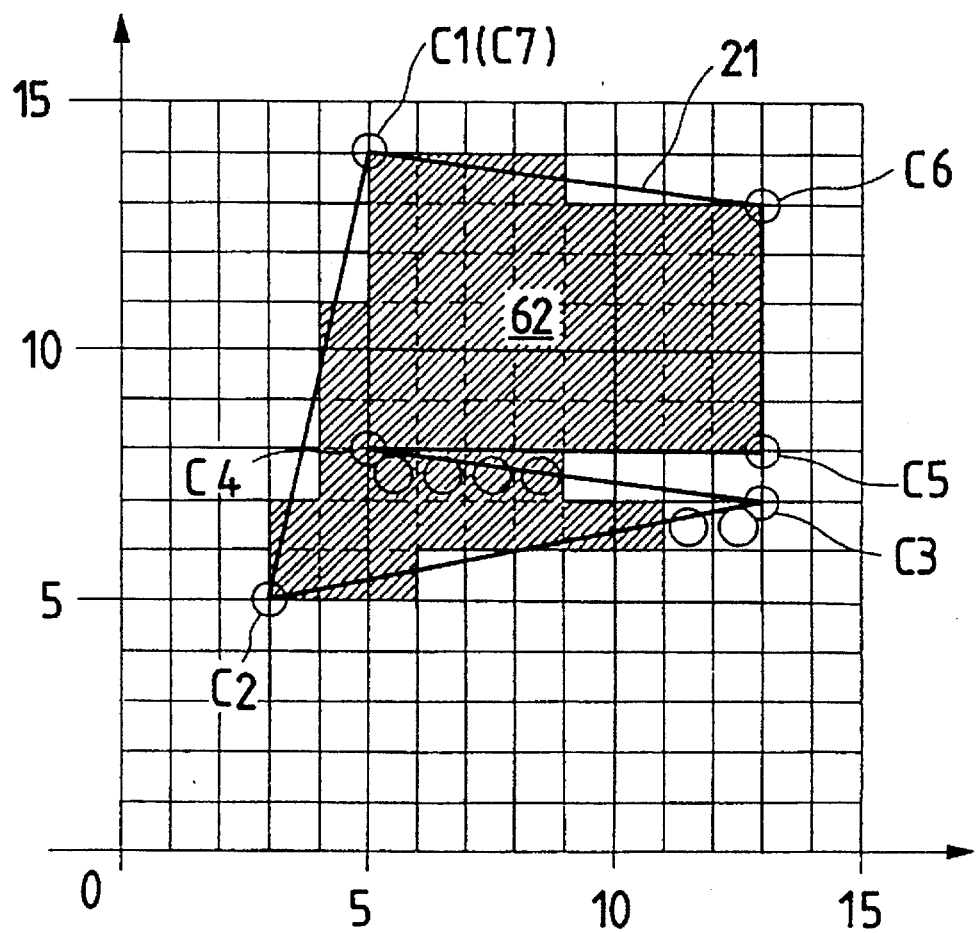
FIG. 14 is an explanatory diagram for the description of bit map font data generated by the second embodiment of the invention.

The duplicate outline data 45 and the filling data 43 are synthesized in S51 shown in FIG. 12. FIG. 14 shows the synthesized bit map font data 62. Each circle shows a pixel of the duplicate outline data 45 and each hatched portion a pixel of the filling data 43.

Only two pixels are out of the filling data 43, and these pixels supplement a portion lost, i.e., a portion around C3, due to the original outline being too thin in the filling data 43.

Compared with the data 63 (FIG. 10) obtained by synthesizing the filling data 43 and the entire outline data 41, there is no deformation in the sharp edge of the outline segments C3–C4–C5. The outline segments C2–C3, C5–C6, and the like are not thickened. The reproducibility of the outline is also acceptable.

As in the description of the first aspect of the invention, the bit map font data generated by the second embodiment of the invention is shown in FIG. 15 (D) in comparison with conventional data. No deformation in character stroke nor increase in density are observed. The loss of strokes is also avoided, thus allowing the character strokes to be identified easily, even through the font data are of small dot size.

Some other modes of embodiment will be described.

As in the first embodiment of the invention, the sequence of tracing the outline (counterclockwise, clockwise) and the scanning direction for filling may be opposite.

Further, as in the first embodiment of the invention, judgment may be made as to whether or not a pixel is equivalent to a pixel of the edge data 42 or to a pixel of the duplicate outline data 45 for every pixel.

Furthermore, as in the first embodiment of the invention, the duplicate outline data 45 may be stored in the form of coordinate data and written over the filling data 43 after the filling data has been generated.

The same applies to the generation of the entire outline data 41.

Further, the same applies to the reuse of the generated bit map font data.

As described in the foregoing, in the first embodiment of the invention, pixel data for filling an area surrounded by the outline segments is generated from data expressing outline segments by the filling data generating means. Pixel data expressing outline segments whose directions are either left or right, or either up or down, when the outline is traced around is generated by the selected outline data generating means. The filling pixel data and the pixel data expressing the outline segments are synthesized by the data synthesizing means.

On the other hand, with the second embodiment of the invention, pixel data expressing a plurality of outline segments are generated from data expressing outline segments by the duplicate outline data generating means. And the filling pixel data and the pixel data expressing the plurality of outline segments are synthesized by the data synthesizing means.

Therefore, the produced font is free from character stroke blurs as in the conventional bit map font data produced only by the filling data, nor is there any such trouble as thickening, deformation of the character strokes nor increase in density as observed in the data produced by synthesizing the filling data and the entire outline data. There is no reduction in processing speed nor any increase in the amount of data due to the presence of hint information as in the case of modifying the outline segment using the hint information.

The invention is particularly effective in improving the character quality of bit map font data of small dot size. Free from lost character strokes, the data produced by the invention allows the characters or the like to be identified easily, although they are of small dot size.

The second embodiment is not designed so that the processing is altered in accordance with the direction of tracing the outline as in the first embodiment. Therefore, it is simpler than the first embodiment of the invention, which thus leads to easier implementation.

What is claimed is:

1. A font data generator for a computer, comprising:

first means for tracing data corresponding to outline segments of an image;

second means for generating, from said data corresponding to said outline segments, first pixel data corresponding to an area surrounded by said outline segments;

third means for generating, from said data corresponding to said outline segments, second pixel data corresponding to said outline segments;

fourth means for selecting at least one of (A) only one of a right to left tracing direction and a left to right tracing direction, and (B) only one of a top to bottom tracing direction and a bottom to top tracing direction;

fifth means for selecting, from said second pixel data, third pixel data corresponding to outline segments that, during one of a clockwise and counterclockwise tracing, are at least partially traced in the selected tracing direction; and sixth means for synthesizing said first pixel data and said third pixel data.

2. The font data generator as defined in claim 1, wherein said fifth means selects, from said second pixel data, the third pixel data that, during a counterclockwise tracing of the outline segments, are traced in a right to left direction and a top to bottom direction.

3. The font data generator as defined in claim 1, wherein said fifth means selects, from said second pixel data, the third pixel data that, during a counterclockwise tracing of the outline segments, are traced in a left to right direction and a bottom to top direction.

4. The font data generator as defined in claim 1, wherein said fifth means selects, from said second pixel data, the third pixel data that, during a clockwise tracing of the outline segments, are traced in a right to left direction and a top to bottom direction.

5. The font data generator as defined in claim 1, wherein said fifth means selects, from said second pixel data, the third pixel data that, during a clockwise tracing of the outline segments, are traced in a left to right direction and a bottom to top direction.

6. A font data generator for a computer, comprising:

means for generating, from data corresponding to outline segments of images, first pixel data corresponding to an area surrounded by said outline segments;

means for generating, from said data corresponding to outline segments, second pixel data corresponding to more than one of the outline segments; and a data synthesizing means for synthesizing said first and second pixel data, said data synthesizing means allowing synthesis only in one direction along any selected scanning axis.

* * * * *